United States Patent
Lee et al.

(10) Patent No.: US 9,310,643 B2
(45) Date of Patent: Apr. 12, 2016

(54) METHOD AND STRUCTURE FOR FABRICATING SMOOTH MIRRORS FOR LIQUID CRYSTAL ON SILICON DEVICES

(75) Inventors: Roger Lee, Shanghai (CN); Guoqing Chen, Shanghai (CN); Lee Chang, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 295 days.

(21) Appl. No.: 12/420,706

(22) Filed: Apr. 8, 2009

(65) Prior Publication Data
US 2009/0200564 A1 Aug. 13, 2009

Related U.S. Application Data

(62) Division of application No. 10/927,707, filed on Aug. 26, 2004, now Pat. No. 7,527,993.

(30) Foreign Application Priority Data

Jun. 2, 2004 (CN) .......................... 2004 1 0024969

(51) Int. Cl.
*G02F 1/136* (2006.01)
*G02F 1/1335* (2006.01)
(Continued)

(52) U.S. Cl.
CPC ........ *G02F 1/133553* (2013.01); *G02F 1/1368* (2013.01); *G02F 1/136286* (2013.01); *G02F 1/136277* (2013.01)

(58) Field of Classification Search
CPC ............ G02F 1/1368; G02F 1/136227; G02F 1/136277

USPC ............ 349/42–43; 438/30, 670; 257/59, 72; 345/92
See application file for complete search history.

(56) References Cited

U.S. PATENT DOCUMENTS 5,366,908 A * 11/1994 Pelella .......................... 438/207
5,459,106 A * 10/1995 Yamada et al. ................. 438/38
(Continued)

FOREIGN PATENT DOCUMENTS

JP 60253962 A * 12/1985 ............. G01N 27/62
JP 06148658 A * 5/1994 ............. G02F 1/1343
(Continued)

OTHER PUBLICATIONS

Van Zant, Peter; Microchip Fabrication; Mc Graww Hill; 5th Edition; 2004; pp. 319-320.
(Continued)

*Primary Examiner* — Hoan C Nguyen
(74) *Attorney, Agent, or Firm* — Kilpatrick Townsend & Stockton LLP

(57) ABSTRACT

A liquid crystal on silicon (LCOS) device includes a semiconductor substrate, a metal-oxide semiconductor (MOS) device layer overlying the semiconductor substrate, a planarized interlayer dielectric layer overlying the MOS device layer, a plurality of recessed regions formed within a portion of the interlayer dielectric layer, a metal layer filling each of the recessed regions to form a plurality of respective electrode plates corresponding to each of the recessed regions. The LCOS device further includes a protective layer overlying a surface of each of the plurality of electrode plates, a liquid crystal film overlying the protective layer, and a mirror finish formed on each of the surface of the electrode plates for reflecting light. The mirror finish is substantially free from dishes and scratches from a chemical mechanical polishing process.

14 Claims, 2 Drawing Sheets

Procedure of Al Pad Formation (I)

Procedure of Al Pad Formation (II)

(51) Int. Cl.
    *G02F 1/1368*    (2006.01)
    *G02F 1/1362*    (2006.01)

(56)            References Cited

U.S. PATENT DOCUMENTS

| | | | |
|---|---|---|---|
| 5,461,501 A | 10/1995 | Sato et al. | |
| 5,721,596 A * | 2/1998 | Kochi | 349/42 |
| 5,818,100 A * | 10/1998 | Grider et al. | 257/616 |
| 5,926,160 A * | 7/1999 | Furuya | 345/98 |
| 5,990,988 A * | 11/1999 | Hanihara et al. | 349/48 |
| 6,019,926 A * | 2/2000 | Southward et al. | 264/216 |
| 6,143,671 A | 11/2000 | Sugai | |
| 6,259,495 B1 * | 7/2001 | Maeda | 349/42 |
| 6,411,349 B2 * | 6/2002 | Nakazawa et al. | 349/42 |
| 6,472,306 B1 | 10/2002 | Lee et al. | |
| 6,545,654 B2 * | 4/2003 | Pombo et al. | 345/87 |
| 6,576,550 B1 | 6/2003 | Brase et al. | |
| 6,853,419 B2 * | 2/2005 | Iwasa | 349/113 |
| 7,087,507 B2 * | 8/2006 | Koldiaev et al. | 438/528 |
| 7,420,628 B1 * | 9/2008 | Hiroki et al. | 438/30 |
| 7,527,993 B2 | 5/2009 | Lee et al. | |
| 2002/0005583 A1 * | 1/2002 | Harada et al. | 257/758 |
| 2003/0143768 A1 | 7/2003 | Chen et al. | |
| 2004/0067640 A1 * | 4/2004 | Hsu et al. | 438/637 |
| 2004/0115923 A1 | 6/2004 | Macneil | |
| 2005/0007323 A1 | 1/2005 | Appelbaum et al. | |
| 2008/0137010 A1 * | 6/2008 | Kumai | 349/96 |

FOREIGN PATENT DOCUMENTS

| | | | | | |
|---|---|---|---|---|---|
| JP | 09073103 A | * | 3/1997 | | G02F 1/136 |
| JP | 2001176846 A | * | 6/2001 | | H01L 21/3065 |

OTHER PUBLICATIONS

Wolf et al., Silicon Processing for the VLSI Era; Process Technology Lattice Press; 1986; vol. 1; p. 335.
Notice of Allowance for U.S. Appl. No. 10/927,707, mailed on Dec. 29, 2008, 6 pages.
Final Office Action for U.S. Appl. No. 10/927,707, mailed on May 12, 2008, 9 pages.
Non-Final Office Action for U.S. Appl. No. 10/927,707, mailed on Apr. 4, 2007 8 pages.
Non-Final Office Action for U.S. Appl. No. 10/927,707, mailed on Oct. 18, 2006, 8 pages.
Requirement for Restriction/Election for U.S. Appl. No. 10/927,707, mailed on Jul. 6, 2006, 5 pages.
Wolf et al., Silicon Processing for the VLSI Era, vol. 1—Process Technology, Lattice Press, 1986, p. 335.
Van Zant, Microchip Fabrication, 5th Edition, 2004, McGraw Hill, 319-320.

* cited by examiner

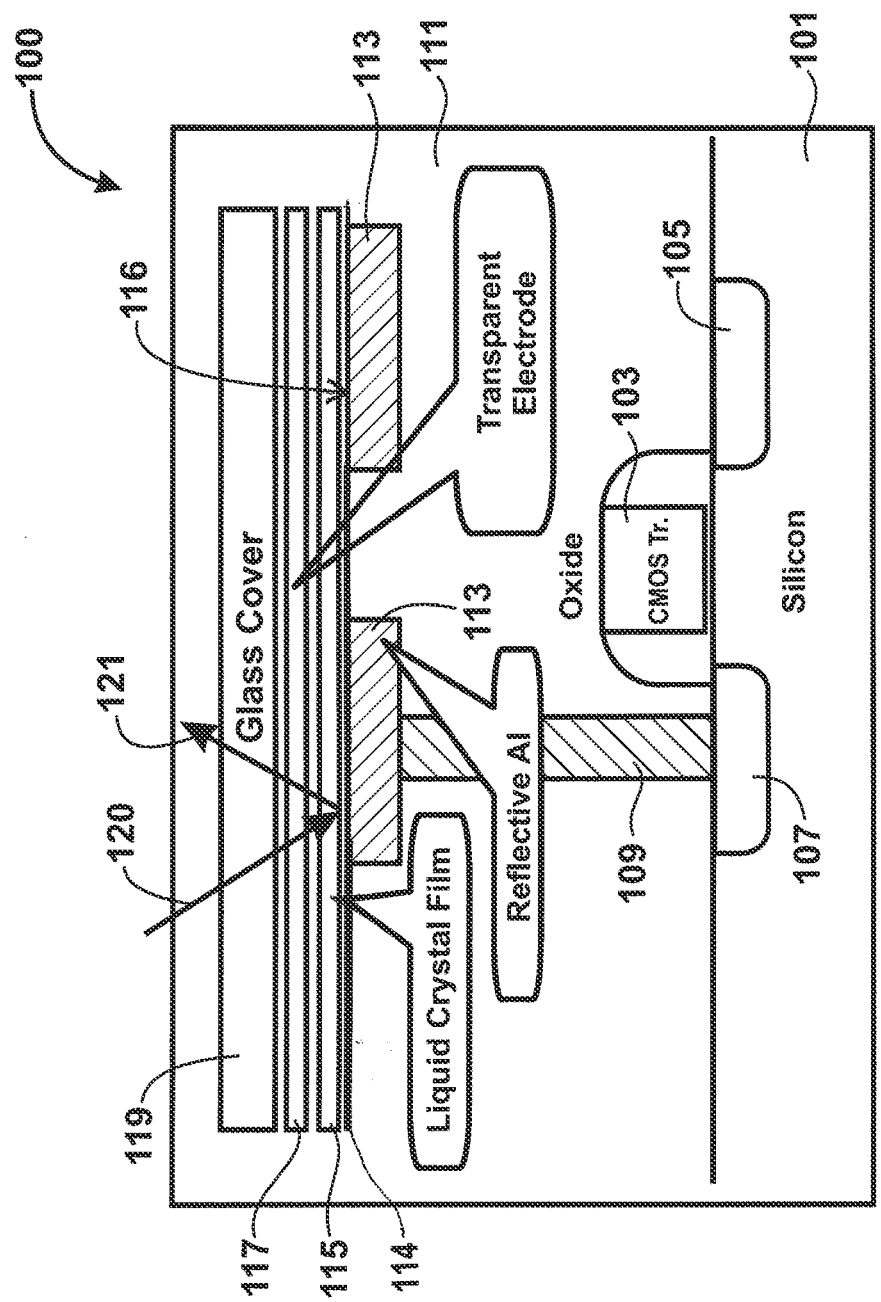
FIGURE 1. Schematic of a LCOS Structure

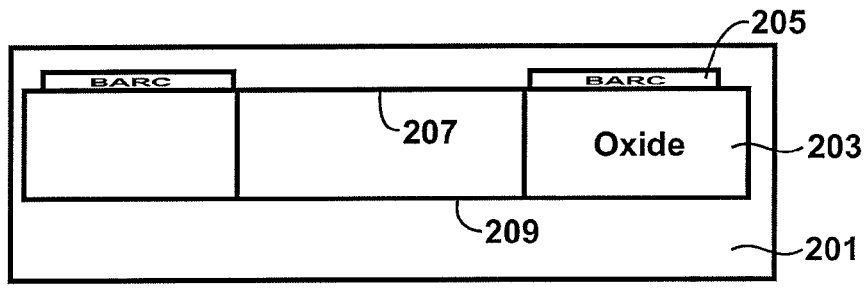
FIGURE 2. Procedure of Al Pad Formation (I)
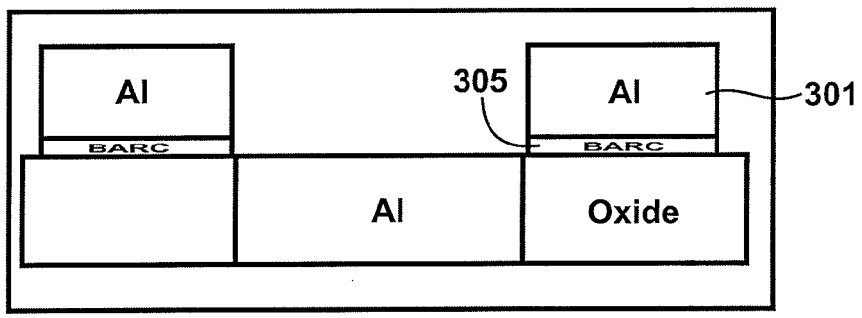
FIGURE 3. Procedure of Al Pad Formation (II)
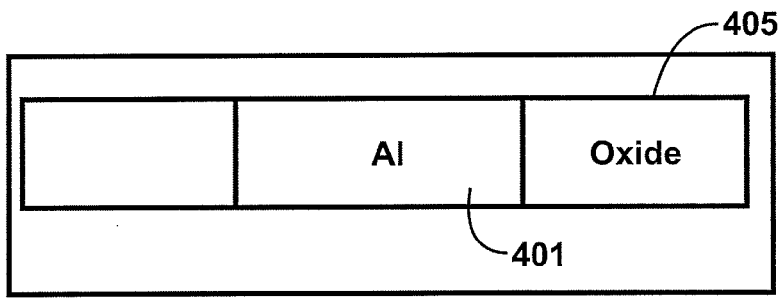
FIGURE 4. Procedure of Al Pad Formation (III)

METHOD AND STRUCTURE FOR FABRICATING SMOOTH MIRRORS FOR LIQUID CRYSTAL ON SILICON DEVICES

CROSS-REFERENCES TO RELATED APPLICATIONS

This application is a divisional of U.S. patent application Ser. No. 10/927,707 filed Aug. 26, 2004, which is now allowed, and which claims the benefit of Chinese Patent Application No. 200410024969.9 filed Jun. 2, 2004, commonly assigned, and hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to integrated circuits and their processing for the manufacture of electronic devices. More particularly, the invention provides a method for manufacturing an electrode structure for a liquid crystal on silicon ("LCOS") device for displays. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Unfortunately, liquid crystal panels often had low yields and were difficult to scale up to larger sizes. These LCDs were often unsuitable for larger displays often required for television sets and the like.

Accordingly, projection display units have been developed. These projection display units include, among others, a counterpart liquid crystal display, which outputs light from selected pixel elements through a lens to a larger display to create moving pictures, text, and other visual images. Another technology is called "Digital Light Processing" (DLP), which is a commercial name from Texas Instruments Incorporated (TI) from Texas, USA. DLP is often referred to as the use of "micro-mirrors." DLP relies upon a few hundred thousand tiny mirrors, which line up in 800 rows of 600 mirrors each. Each of the mirrors is hinged. An actuator is attached to each of the hinges. The actuator is often electrostatic energy that can tilt each of the mirrors at high frequency. The moving mirrors can modulate light, which can be transmitted through a lens and then displayed on a screen. Although DLP has been successful, it is often difficult to manufacture and subject to low yields, etc.

Yet another technique is called LCOS. LCOS uses liquid crystals applied to a reflective mirror substrate. As the liquid crystals "open" or "close," light is reflected or blocked, which modulates the light to create an image for display. Compared to the conventional transmissive LCD, a reflective LCOS display allows more light to be passed through the optics and therefore it provides a higher luminance.

As indicated in FIG. 1, aluminum is often used as the reflective film for electrodes. To get high reflectivity, a smooth aluminum/oxide structures is often needed. The conventional method to smooth the aluminum/oxide is chemical mechanical planarization, commonly called the Al CMP process. However, CMP process, however, causes many issues, such as dishing, micro-scratching and oxidation of the Al surface. These and other limitations are described in greater detail below.

From the above, it is seen that an improved technique for processing devices is desired.

BRIEF SUMMARY OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

In a specific embodiment, the invention provides a method for fabricating a liquid crystal on silicon display device. The method includes providing a substrate, e.g., silicon wafer. The method includes forming a transistor layer overlying the substrate. Preferably, the transistor layer has a plurality of MOS devices therein. The method includes forming an interlayer dielectric layer (e.g., BPSG, FSG) overlying the transistor layer. The method includes planarizing the interlayer dielectric layer and forming a sacrificial layer (e.g., bottom antireflective coating, polymide, photoresist, polysilicon) overlying the planarized interlayer dielectric layer. The method includes forming a plurality of recessed regions within a portion of the interlayer dielectric layer through the sacrificial layer while other portions of the interlayer dielectric layer remain intact. Preferably, lithographic techniques are used for forming the recessed regions. The method includes forming an aluminum layer (or other reflective layer or multilayers) to fill the recessed regions and overlying remaining portions of the sacrificial layer and selectively removing the aluminum layer overlying portions of the sacrificial layer to form a plurality of electrode regions corresponding to each of the recessed regions.

In an alternative specific embodiment, the invention provides an alternative method for forming a liquid crystal on silicon display device. The method includes providing a semiconductor substrate and forming a transistor layer overlying the substrate. Preferably, the transistor layer has a plurality of MOS devices, each of which includes a first contact region and a second contact region. The method also includes forming an interlayer dielectric layer overlying the transistor layer and planarizing the interlayer dielectric layer to form a planarized surface region. Optionally, the dielectric layer has already been planarized. The method includes forming a sacrificial layer overlying the planarized surface region of the planarized interlayer dielectric layer and forming a plurality of recessed regions within a portion of the interlayer dielectric layer through the sacrificial layer while other portions of the interlayer dielectric layer remain intact. The method includes forming a metal layer (e.g., aluminum) to fill the recessed regions and overlying remaining portions of the sacrificial layer. The metal layer is selectively removed overlying portions of the sacrificial layer to form a plurality of electrode regions corresponding to each of the recessed regions. Each of the electrode regions is respectively coupled to each of the MOS devices among the plurality of MOS devices. Preferably, portions of the metal layer are lift off via sacrificial layer, which is removed. The method also includes forming a protective layer overlying surface regions of each of the plurality of electrode regions to finish the surface regions to a mirror finish for each of the electrode regions.

In yet an alternative specific embodiment, the invention provides an LCOS device. The LCOS device has a semiconductor substrate. An MOS device layer is formed overlying the semiconductor substrate. Preferably, the MOS device layer has a plurality of MOS devices. A planarized interlayer dielectric layer is formed overlying the MOS device layer. The LCOS device also has a plurality of recessed regions within a portion of the interlayer dielectric layer and a metal layer (e.g., aluminum) to fill each of the recessed regions to form respective plurality of electrode regions corresponding to each of the recessed regions. Each of the electrode regions is respectively coupled to at least one of the MOS devices among the plurality of MOS devices. A protective layer is formed overlying surface regions of each of the plurality of electrode regions to protect the surface regions. A mirror finish is on each of the surface regions. Preferably, the mirror finish is substantially free from dishes and scratches from a chemical mechanical polishing process.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for an improved mirror surface for LCOS devices for displays. Such mirror surface is free from dishing and/or microdefects often caused by chemical mechanical planarization or other techniques. Additionally, the mirror surface is free from oxidation that leads to poor reflectivity. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 1 is a simplified cross-sectional view diagram of an LCOS device according to an embodiment of the present invention.

FIGS. 2 through 4 illustrate a method for forming an LCOS device according to an embodiment of the present invention.

DETAILED DESCRIPTION OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

As noted, FIG. 1 is a simplified cross-sectional view diagram of an LCOS device 100 according to an embodiment of the present invention. This diagram is merely an example, which should not unduly limit the scope of the claims herein. One of ordinary skill in the art would recognize many variations, alternatives, and modifications. As shown, the LCOS device 100 has a semiconductor substrate 101, e.g., silicon wafer. An MOS device layer 103 is formed overlying the semiconductor substrate. Preferably, the MOS device layer has a plurality of MOS devices. Each of the MOS devices has a contact region 107 for an electrode and a contact region 105 for a voltage potential. A planarized interlayer dielectric layer 111 is formed overlying the MOS device layer. The LCOS device also has a plurality of recessed regions within a portion of the interlayer dielectric layer and a metal layer (e.g., aluminum) to fill each of the recessed regions to form a plurality of respective electrode plates 113 corresponding to each of the recessed regions. Each of the electrode plates is coupled to at least one of the MOS devices among the plurality of MOS devices via an interconnect structure 109, which may be a plug or other like structure. A protective layer 114 is formed overlying a surface of each of the plurality of electrode plates to protect the surface of the electrode plates. A mirror finish 116 is on each of the surface of the electrode plates (interchangeably referred to as "electrodes" hereinafter). Preferably, the mirror finish is substantially free from dishes and scratches from a chemical mechanical polishing process. Each of the electrodes may have a thickness ranging from about 2000 Angstroms to about 4000 Angstroms and can be at other dimensions. Each of the electrodes represents a pixel element in an array of pixel elements for the LCOS device. Also shown are liquid crystal film 115 overlying the electrodes. The LCOS device also has a transparent electrode layer (e.g., indium tin oxide) 117 and an overlying glass plate 119 to enclose the multilayered structure. Details on ways of operating the LCOS device can be found throughout the present specification and more particularly below.

To operate the LCOS device, light 120 traverses through the glass cover, through the transparent electrode layer, and to the liquid crystal film. When the electrode is not biased, the liquid crystal film is essentially in the off position, which does not allow the light to pass there through. Rather, light is blocked and does not reflect off of the mirror surface of the electrode. When the electrode is biased via a MOS device, the liquid crystal film is in an on-position, which allows light to pass 121. The light reflects off of the surface of the electrode and through the liquid crystal film, which is in an on-position. Preferably, the mirror surface is substantially free from imperfections. Accordingly, at least 93% of the incoming light passes out 121 of the LCOS device. Details on ways of fabricating the LCOS device can be found throughout the present specification and more particularly below.

A method for fabricating an electrode structure for an LCOS device according to an embodiment of the present invention may be outlined as follows:

1. Provide a substrate;
2. Form a layer of transistor elements overlying the substrate;
3. Form an interlayer dielectric layer overlying the layer of transistor elements;
4. Form contacts to transistor elements;
5. Form a sacrificial layer overlying the interlayer dielectric layer;

6. Pattern the interlayer dielectric layer to form a plurality of recessed regions within the interlayer dielectric layer;

7. Form an aluminum layer overlying the recessed region and exposed portions of the interlayer dielectric layer to fill each of the recessed regions, where the aluminum layer thickness is controlled to be the same as the recessed region depth;

8. Remove portions of the aluminum layer from the interlayer dielectric layer while the aluminum layer in the recessed regions remain intact;

9. Form a protective layer overlying surface regions of the aluminum layer remaining in the recessed regions;

10. Provide a liquid crystal layer overlying the protective layer, a transparent electrode layer overlying the liquid crystal layer, and a glass layer overlying the transparent electrode layer to form the LCOS device; and 11. Perform other steps, as desired.

The above sequence of steps provides a method according to an embodiment of the present invention. As shown, the method uses a combination of steps including a way of forming an electrode structure for an LCOS device. Other alternatives can also be provided where steps are added, one or more steps are removed, or one or more steps are provided in a different sequence without departing from the scope of the claims herein. Further details of the present method can be found throughout the present specification and more particularly below.

FIGS. 2 through 4 illustrate a method for forming an LCOS device according to an embodiment of the present invention. These diagrams are merely examples, which should not unduly limit the scope of the claims herein. One of ordinary skill in the art would recognize many variations, alternatives, and modifications. As shown in FIG. 1 for illustrative purposes, the method begins by providing a semiconductor substrate, e.g., silicon wafer. The method includes forming a transistor layer overlying the substrate. Preferably, the transistor layer has a plurality of MOS devices, each of which includes a first contact region and a second contact region. The method also includes forming an interlayer dielectric layer overlying the transistor layer. The interlayer dielectric layer can be made of BPSG, FSG, oxide, any combination of these, and the like. Preferably, the interlayer dielectric layer is formed using a chemical vapor deposition process. The method then planarizes the interlayer dielectric layer to form a planarized surface region. Optionally, the interlayer dielectric layer has already been planarized.

Referring now to FIG. 2, the method includes forming a sacrificial layer 205 overlying the planarized surface region of the planarized interlayer dielectric layer. The sacrificial layer can be made from any suitable material that is capable of lifting off under predetermined conditions. Such materials include, among others, organic antireflective coatings (ARC), polysilicon, photoresist (or other polymer structure), polyimide, any combination of these, and the like. The sacrificial layer is patterned. Additionally, the method via patterning forms a plurality of recessed regions 209 within a portion 207 of the interlayer dielectric layer through the sacrificial layer while other portions 203 of the interlayer dielectric layer remain intact. The recessed region has a sufficient depth, e.g., 2000 Angstroms, 4000 Angstroms and less. Each of the recessed regions will correspond to an electrode, which will correspond to a pixel element. In an embodiment, each of the electrode plates is characterized by a size of about eight by eight microns in dimensions (not shown).

The method includes forming a metal layer (e.g., aluminum) 301 to fill the recessed regions as illustrated by FIG. 3. The metal layer such as aluminum is sputtered. Preferably, the aluminum is sputtered in a predetermined direction, e.g., vertical. Here, the aluminum layer is free from attachment to edges of the sacrificial layer, as shown. The method also includes forming the metal layer 301 overlying remaining portions of the sacrificial layer. The metal layer is selectively removed overlying portions of the sacrificial layer to form a plurality of electrode regions corresponding to each of the recessed regions. Optionally, the surface is buffed or slightly polished smoother. The metal layer has a surface that is substantially planar and has almost no surface defects that influence reflectivity. Each of the electrode regions is respectively coupled to each of the MOS devices among the plurality of MOS devices. Preferably, portions of the metal layer are lift-off via sacrificial layer, which is removed 405. Optionally, the method includes a CMP buffing and/or scrubbing step applied to surface 405 to remove any residual aluminum bearing particles and the like. The method also includes forming a protective layer overlying surface regions of each of the plurality of electrode regions 401 to protect the surface regions having a mirror finish for each of the electrode regions. Preferably, at least 93% of the light is reflected back from the mirror finish in completed LCOS devices. The protective layer can be formed by treating the surface of the bare aluminum layer with an oxidizing fluid such as hydrogen peroxide, ozone/water mixtures, and the like. The oxidizing fluid is substantially clean and forms a passivation layer overlying the bare aluminum layer. Depending upon the embodiment, there can be other variations, modifications, and alternatives.

To complete the LCOS device, the method forms a sandwiched layer having liquid crystal materials. Here, a liquid crystal film is formed overlying the electrodes. A transparent electrode structure is formed overlying the liquid crystal film. The method forms a glass plate overlying the transparent electrode. The sandwiched structure is often formed as an assembly, which is later disposed onto surfaces of the electrodes of the LCOS devices. Of course, one of ordinary skill in the art would recognize many variations, alternatives, and modifications.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A liquid crystal on silicon (LCOS) device, the device comprising:
   a semiconductor substrate;
   a metal-oxide semiconductor (MOS) device layer overlying the semiconductor substrate, the MOS device layer having a plurality of MOS devices;
   a planarized interlayer dielectric layer overlying the MOS device layer;
   a plurality of recessed regions formed within a portion of the planarized interlayer dielectric layer;
   an aluminum layer filling each of the recessed regions to form a plurality of respective electrode plates corresponding to each of the recessed regions, the aluminum layer having a smooth surface free from any dimple, each of the electrode plates being coupled to each one of the MOS devices;
   a protective layer of only an aluminum oxide layer directly overlying a surface of each of the plurality of electrode plates, the protective layer formed by exposing the electrode plates to an oxidizing fluid;
   a liquid crystal film directly overlying the protective layer; and a mirror finish formed on the surface of each of the electrode plates for reflecting light by a chemical mechanical polishing process, the mirror finish being substantially free from dishes and scratches.

2. The device of claim 1 wherein the mirror finish is characterized by a buffed surface region free from any residual aluminum bearing particles on the protective layer.

3. The device of claim 1 wherein the recessed regions are formed through respective openings in a sacrificial layer.

4. The device of claim 1 wherein the aluminum layer is provided by directionally sputtering.

5. The device of claim 1 wherein the chemical mechanical polishing process is a buffing process.

6. The device of claim 1 wherein the mirror finish is characterized by a reflectivity of 93% and greater.

7. The device of claim 1 wherein each of the recessed regions has a depth ranging from about 2000 Angstroms to about 4000 Angstroms.

8. The device of claim 1 wherein the planarized interlayer dielectric layer comprises Borophosphosilicate glass (BPSG).

9. The device of claim 1 wherein each of the electrode plates is characterized by a size of about eight by eight microns in dimension.

10. The device of claim 1 further comprising:
an overlying transparent electrode layer on the liquid crystal film; and
an overlying glass layer overlying the transparent electrode layer to form a liquid crystal on silicon display structure overlying the plurality of electrode plates.

11. The device of claim 10 wherein the transparent electrode layer comprises indium tin oxide.

12. A liquid crystal on silicon (LCOS) device, the device comprising:
a semiconductor substrate;
a metal-oxide semiconductor (MOS) device layer overlying the semiconductor substrate, the MOS device layer having a plurality of MOS devices;
a planarized interlayer dielectric layer overlying the MOS device layer;
a plurality of recessed regions within a portion of the planarized interlayer dielectric layer;
an aluminum layer to fill the plurality of recessed regions to form a plurality of respective electrode plates corresponding to each of the recessed regions, the electrode plates having a smooth surface free from any dimple, each of the electrode plates being respectively coupled to at least one of the MOS devices among the plurality of MOS devices;
a protective layer of only an aluminum oxide layer formed by treating a surface of the aluminum layer with an oxidizing fluid;
a liquid crystal film directly overlying the protective layer;
a mirror finish on the surface of each of the electrode plates.

13. The device of claim 12 further comprising:
an overlying transparent electrode layer on the liquid crystal film; and
a glass layer overlying the transparent electrode layer to form a liquid crystal on silicon display structure overlying the plurality of electrode plates.

14. The device of claim 13 wherein the transparent electrode layer comprises indium tin oxide.

* * * * *